United States Patent

Füldner et al.

[11] Patent Number: 5,166,915
[45] Date of Patent: Nov. 24, 1992

[54] PROCESS FOR TRACK JUMPING

[75] Inventors: Friedrich Füldner; Günter Gleim, both of Villingen-Schwenningen, Fed. Rep. of Germany

[73] Assignee: Deutsche Thomson-Brandt GmbH, Villingen, Fed. Rep. of Germany

[21] Appl. No.: 525,252

[22] Filed: May 17, 1990

[30] Foreign Application Priority Data

May 20, 1989 [DE] Fed. Rep. of Germany ....... 3916462

[51] Int. Cl.$^5$ .............................................. G11B 7/085
[52] U.S. Cl. ................................. 369/44.28; 369/32; 369/44.26
[58] Field of Search ............... 369/44.28, 32, 44.25, 369/44.26, 44.27

[56] References Cited

U.S. PATENT DOCUMENTS

| | | | |
|---|---|---|---|
| 4,481,613 | 11/1984 | Yokota | 369/44.28 |
| 4,539,665 | 9/1985 | Iso et al. | 369/44.25 |
| 4,779,251 | 10/1988 | Burroughs | 369/44.28 |
| 4,858,214 | 8/1989 | Baba | 369/32 |
| 5,001,732 | 3/1991 | Nomura et al. | 369/44.25 |
| 5,023,855 | 6/1991 | Kobayashi et al. | 369/32 |

Primary Examiner—Jeffery A. Brier
Assistant Examiner—Khoi Truong
Attorney, Agent, or Firm—Max Fogiel

[57] ABSTRACT

An arrangement for track skipping in a track control circuit with an optical scanner, in which two light beams reflected from an information medium, strike each onto a separate photodetector. The two outputs of the photodetectors are subtracted to generate a sine-shaped track error signal representing a difference between a track being scanned and a desired track to be scanned. The track control circuit is supplied at the beginning of track skipping with an offset quantity for skipping across a number of tracks. This offset quantity is dimensioned so that a light beam incident on the information medium for tracking data thereon, becomes displaced by a predetermined amount of track center and thereby radiates partially on the track being scanned and partially on the space between the track being scanned and an adjacent track. The track error signal becomes inverted by an amount equal to twice the number of tracks skipped. The offset quantity becomes separated from the track control circuit earliest after the first inversion and latest after the last inversion of the track error signal. The track control circuit remains closed during track skipping.

13 Claims, 4 Drawing Sheets $HF = AS + BS + CS + DS$ $FE = (AS + CS) - (BS + DS) = 0$ $TE = ES - FS = 0$ $FE = (AS + CS) - (BS + DS) = 0$ $TE = ES - FS < 0$ $FE = (AS + CS) - (BS + DS) = 0$ $TE = ES - FS > 0$

PROCESS FOR TRACK JUMPING

BACKGROUND OF THE INVENTION

The invention concerns a process for track jumping for a track control circuit with an optical scanning device, at which a first and a second light beam are reflected by a information medium to one photo diode each and at which, from the output signal of the two photo detectors, a sinus-shaped track error signal, that is the deviation of actual value from nominal value, are produced by subtraction.

CD-players, video record players, DRAW-disc-player or magneto-optical recording- and reproducing-sets are for instance equipped with an optical scanning device.

Construction and function of an optical scanning device, a so-called optical pick-up, are described in Electronic Components & Applications, Vol. 6, No. 4, 1984 on the pages 209 to 215.

The lightbeam emitted by a laser diode is focused by lenses on the CD-record and from there reflected to a photo detector. The data stored on the CD-record are obtained from the output signal of the photo detector, as is the actual value for the focus- and for the track-control circuit. In the literature reference the deviation of the actual value (quantity) from the nominal value (quantity) for the focus control circuit is named as focusing error, while for the deviation of the actual value from the nominal value of the track control circuit, the expression radial tracking error is chosen.

A coil serves as positioning element for the focus control circuit. By the magnetic field of the same, a lens is movable along the optical axis. The focus control circuit causes now, by shifting of the lens, that the light beam emitted by the laser diode will always be focused on the CD-record. With a track control circuit, often called also radial drive, the optical scanning device is movable relative to the CD-record in radial direction. By this the light beam can be guided on the spiral-shaped data track of the CD-record.

In some sets the radial drive is constructed using a so-called coarse- and a so-called fine-drive. The coarse-drive is for instance realized as a spindle, by which the total optical scanning device, the laser diode, the lenses, the prism beam splitter and the photo detector, are radially movable. With the fine-drive the light beam is additionally movable in radial direction or e.g. tiltable about a predetermined small angle. With the fine-drive, the light-beam can be moved a small path—about 1 mm—along a radius of the CD-record.

In order to achieve an unobjectionable reproduction of the data, be it e.g. picture and audio at a video record player or only audio at a CD-record or the data at a magneto-optical record, then it is necessary to focus the light beam exactly on the record and also guide precisely along the data track of the record.

FIG. 1 shows the photodetector PD of the optical scanning device of a CD-player, in which three laser beams L1, L2 and L3 are focused on the CD-record. The laser beam L2 and L3 are the diffraction beams of +1 and −1 order. Such a scanning device is named a Three-Beam-Pick-Up in the literature reference cited in the beginning, because this device operates with three light beams.

At the photodetector, four square-shaped photodiodes A, B, C and D are jointly arranged, so that they form a square. Ahead of the square formed by the four diodes A, B, C and D is a rectangular photodiode E; behind the square is a further photodiode F. The mean laser beam L1, which is focused on the four photodiodes A, B, C and D, produces the data signal $HF=AS+BS+CS+DS$ and the focus error signal $FE=(AS-CS)-(BS+DS)$. The two outer light beams L2 and L3, of which the one ahead, L3, is directed to the photodiode E, the one behind, L2, to the photodiode F, produce the track error signal $TE=ES-FS$. The photo voltages of the diodes A, B, C, D, E and F are respectively labeled with AS, BS, CS, DS, ES and FS.

In FIG. 1 the means laser beam L1 follows exactly the middle of track S. The track error signal TE has zero value.

$$TE=ES-FS=0.$$

If the means light beam deviates from the middle of a track S, the one diffraction beam moves more to the center of track, while the other diffraction beam radiates on the space between two tracks S. Because the reflection quality of a track differs from the space between tracks, one of the diffraction beams is more strongly reflected then the other one.

FIG. 2 shows the case in which the laser beams L1, L2 and L3 are shifted to the right from the track S. The track error signal assumes a negative value:

$$TE=ES-FS<0.$$

The positioning element of the track control circuit moves the optical scanning device now so far to left, until the track error signal TE becomes zero.

In the opposite case, when the light beams are shifted to the left from the track, the track error signal will be positive: $TE=ES-FS>0$. Now the positioning element of the track control circuit moves the optical scanning device so for to right, until the track error signal TE becomes zero. This case is shown in FIG. 3.

If the light beam L1 and the respective diffraction beams L2 and L3 cross several data tracks, the track error signal TE assumes the sine shape shown in FIG. 4.

From the JP-OS 60 10 429 patent a track control circuit is known in which the upper and lower envelope of the high-frequency signal can be recognized, if the light beam crosses data tracks. When the light beam crosses several data tracks, the high-frequency signal collapses regularly between two tracks.

In order to detect the tracks crossed by the lightbeam, the envelope of the high-frequency signal will be formed and converted into a rectangular signal, which is supplied to the counting input of a bi-directional counter. In this way the high-frequency glitches are counted by the bi-directional counter.

In order to determine, in which direction the light beam has been moved, radially toward the center or off the center, a so-called direction detecting logic is required. It is known for instance, to supply the track error signal to the D-input of a D-flip-flop and the envelope of the high-frequency signal to the clock input of the flip-flop. The D-flip-flop receives therefore each time a pulse at its clock-input, when the light beam crosses a data track. Because the polarity sign of the track error signal TE depends on the direction, however, in which the light beam leaves a data track, the D-flip-flop is set- its output will be "High"-, in one direction whereas in the other direction its output remains at the opposite at "Low". The signal at the Q-output of the D-flip-flop can therefore serve to determine the direction of counting-forward or backward- of a bi-directional counter. Therefore the bi-directional counter counts, in the case of one direction, forward, while its counts, in the case of the other direction, backward.

These known track control circuits have besides a high effort complexity due to the direction detecting logic, the further drawback, that the control loop of the track control circuit has to be opened for track jumping. The optical scanning device moves therefore without checking by the controller across the tracks to be jumped over on the information medium.

SUMMARY OF THE INVENTION

Therefore it is an object of the invention to develop a process for track jumping such, that the track jumping across one or several tracks can take place at closed control circuits.

The invention solves this object in that an offset-quantity is supplied to the track control circuit for jumping across n tracks, which is dimensioned such, that the light beam scanning the data-track is displaced by a predetermined amount from the middle of track, whereby the beam partially radiates on the track and partially on the space between this track and the adjacent track. After 2n inversions of the track error signal, the offset quantity is separated from the track control circuit, latest after the last inversion of the track error signal.

DESCRIPTION OF THE PREFERRED EMBODIMENT

Figure 1:
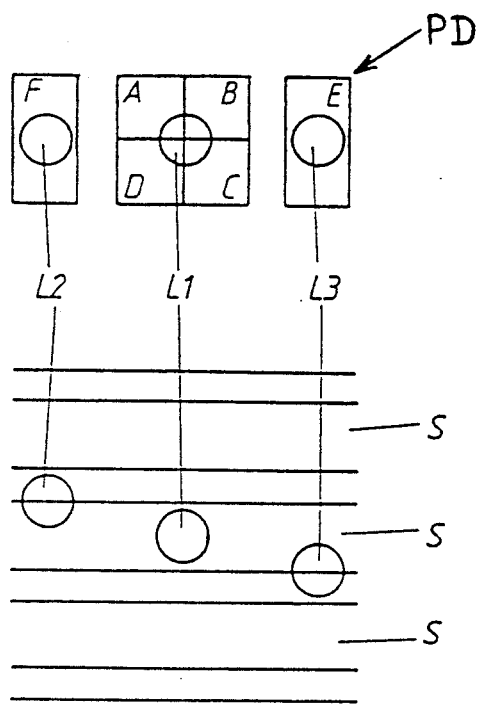
FIG. 1 is a schematic view and shows the photodetector arrangement with three laser beams focused on the compact disc, in accordance with the present invention.
Figure 2:
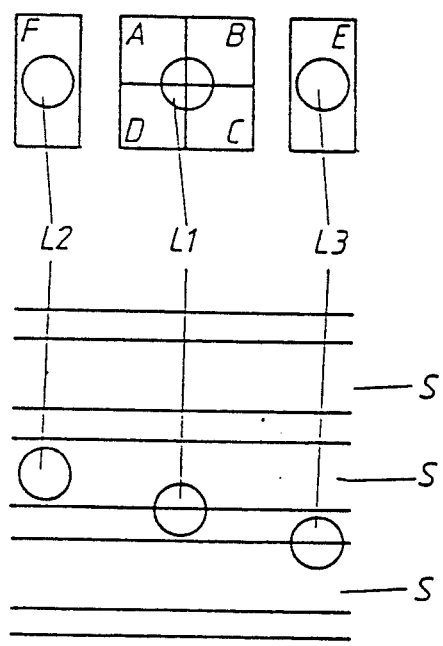
FIG. 2 is a schematic view and shows the situation in which the laser beams in FIG. 1 are shifted to the right from a track.
Figure 3:
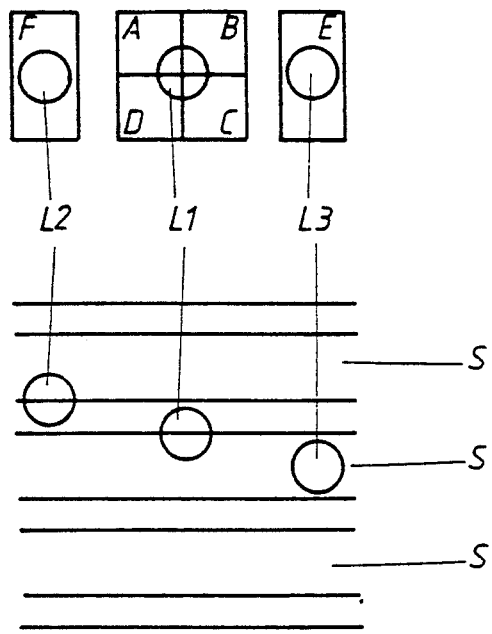
FIG. 3 is a schematic view and shows, opposite to Figure, the situation in which the laser beams are shifted to the left from the track.
Figure 4:
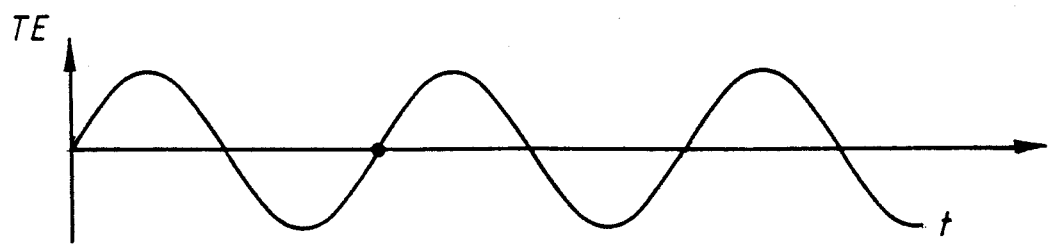
FIG. 4 is a graphical representation and shows the sinusoidal shape of the track error signal when the laser beams cross a plurality of data tracks.
Figure 5:
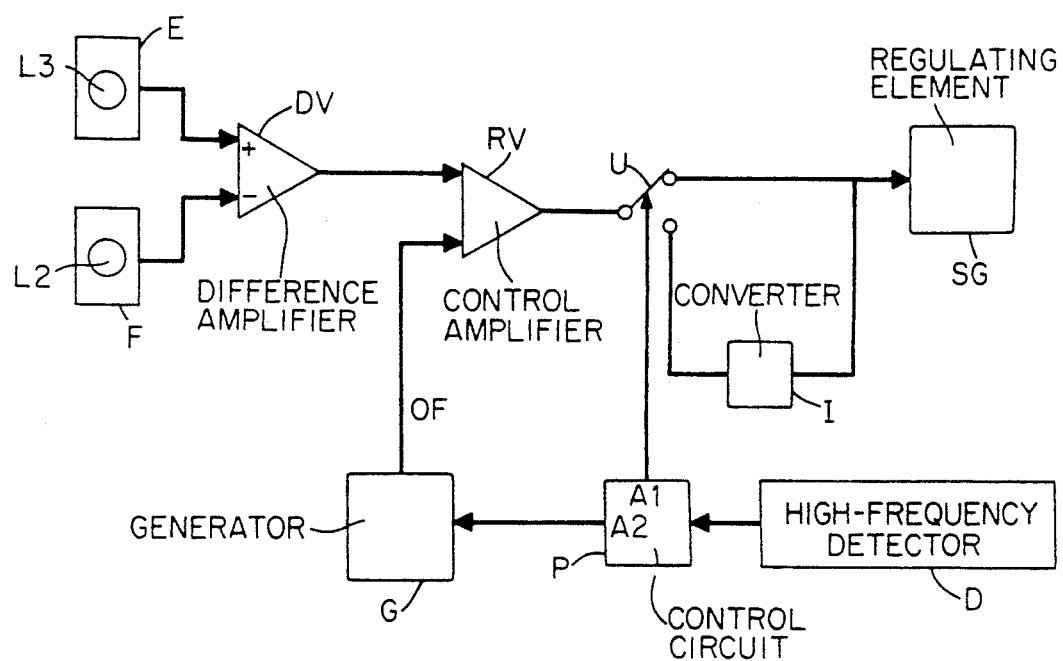
FIG. 5 a track control circuit for realization of the process according to the invention.

In FIG. 5 the two output signals ES and FS of the two photodiodes E and F are supplied to the inputs of a difference amplifier DV, which produces the sine-shaped track error signal TE. The output of the difference amplifier DV, at which the sine-shaped track error signal TE can be taken from, is connected with the first input of a control amplifier RV, whose second input is connected with a generator G to produce a offset-voltage OF. The output of the control amplifier RV is connectable with a regulating element SG of the track control circuit either directly or via a converter I by a controllable change-over switch U. The first output A1 of a control circuit P is connected to the control input of the controllable change-over switch U, the second output A2 is connected to the input of the generator G.

Figure 6:
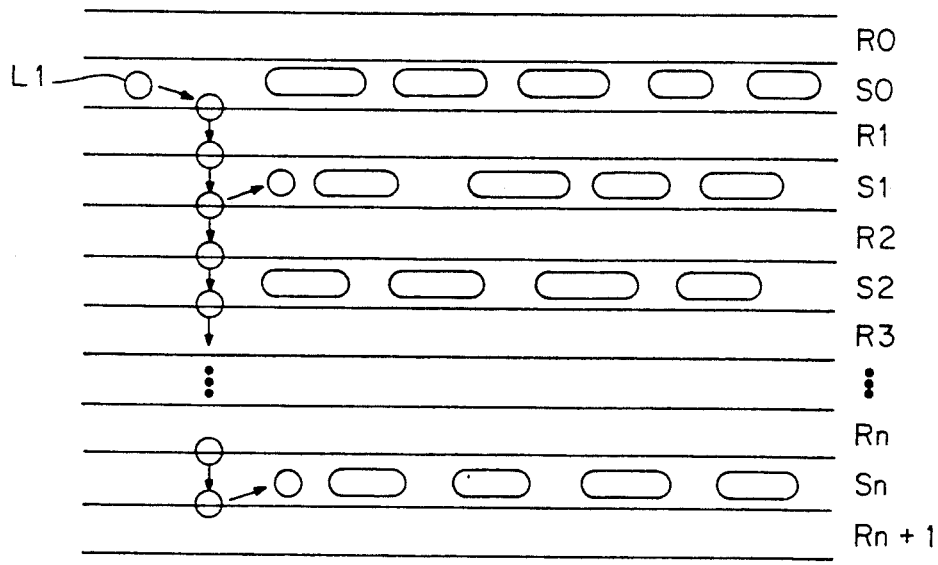
FIG. 6 the motion of the light beam at track jumping according to a first example.

The function of the track control circuit shown in FIG. 5 will be explained using the data tracks S0-Sn of an optical information medium shown in FIG. 6.

If the light beam L1 scanning the data shall jump across one or several tracks the control circuit P causes the generator G to supply a positive or a negative offset-voltage OF to the second input of the control amplifier RV, which e.g. can be constructed as a difference amplifier, whereby the polarity of the offset voltage depends on whether the light beam L1 moves radially across the data tracks inwards or outwards. The amount of the offset voltage OF is dimensioned such, that the mean light beam L1 is no longer in the middle of track S0, but radiates only partially, e.g. one half on the track S0 and one half on the space between tracks R1 between the tracks S0 and S1. The forward and the rear light beam L2 and L3 are then displaced also about the same amount radially inwards or outwards.

The control circuit P causes now, via switching-over of the controllable change-over switch U, that the track error signal TE becomes inverted. Because the track control circuit due to the inversion of the track error signal TE locks now to this space between tracks instead of to the track, the light beam L1 is guided by the control amplifier RV and the regulating element SG to this space between tracks R1, but due to offset voltage, with a shift to the center of the space between tracks. One half of the light beam L1 lands still on the space R1 between the tracks S0 and S1 but by one half it radiates already on the track S1. Now the track error signal TE will again be inverted. Because now the track control circuit locks again on the track, the light beam L1 moves further by a track width, so that it radiates on the track S1 and on the space R2 by one half each. By removing of the offset voltage, the light beam L1 moves exactly on the middle of the track S1.

If the light beam skips across n tracks, then the track error signal TE becomes inverted by the control circuit P by 2n-times through the change-over switch U and the inverter I. After each inversion the light beam skips on by one track width. The track control circuit locks alternatively on a space and a track. Due to the offset voltage, the light beam L1 moves just not from the middle of track to the middle of space, but each time by the same predetermined amount displaced relative to the middle. After 2n inversions the light beam has skipped the n tracks to be skipped or jumped. The control circuit P causes therefore, after the track error signal TE has been inverted 2n-times, that the control amplifier RV will be again separated from the offset voltage OF. Herewith the light beam moves exactly to the middle of the wanted track. In the invention the track control circuit remains closed during track jumping.

The instants for the inversions of the track error signal TE can e.g. be locked in dependence of the level of the high-frequency signal, obtained at the three-beam-process from the output signals of the photodiodes A, B, C and D. If the light beam L1 is exactly aimed at the center of track, the level of the high-frequency signals becomes maximum; however, it is minimum if the light beam L1 radiates on the space between two tracks, when the high-frequency signal collapses, or has its minimum. If the light beam L1, the main beam, radiates due to the offset voltage e.g., each by its half the track and the space, then the level of the high-frequency signal is about 50% of the maximum value. It is therefore possible to provide a threshold value of 50% of the maximum level as criterion for the instant of inversion of the track error signal TE.

Each time, when the level of the high-frequency signal sags from the maximum value to about half thereof and when it rises again from zero to half of it, the track error signal TE will be inverted. This is realized the first time, when the light beam L1 is moved from the center of track by applying the offset voltage, so that it radiate over half the track S0 and the space R1. Due to the inversion of the track error signal the track control circuit guides now the light beam L1 across the space R1 to the next track S1, whereby the high-frequency signal collapses first, in order to rise to about of the maximum value, when the light beam L1 radiates still by half on the space R1 and also by half on the track S1. Because the track error signal will now be inverted a second time, the light beam L1 moves on to the track S1. Due to the offset voltage it does not remain, however, in the center of track, but moves further to the rim, until it radiates by half on the track S1 and already on the next space R2. The level of the high-frequency signal increases therefore first to the maximum value and drops thereafter a second time from the maximum value to its half. Now the track error signal TE will be inverted again, in order to have the described processes repeat themselves and the light beam L1 to cross again a track.

As mentioned already, in jumping across e.g. 100 tracks the offset voltage will be separated from the track control circuit after 200 inversions of the track error signal TE, in order to have the light beam L1 guided back to the center of track.

The offset voltage can be, however, removed from the track control circuit before the first inversion of the track error signal. The offset voltage must be removed at the latest after the last inversion of the track error signal. It depends on the type of track control circuit, as to which instant is optimal for separation of the offset voltage. The most optimal instant can be determined e.g. by tests. The light beam L1 would move undefined after inversion of the track error signal TE without the offset voltage OF, that is at random radially inward or outward.

In some track control circuits it can occur, that the optical scanning device becomes steadily faster during track jumping, so that the track control circuit runs out of control, when the offset voltage is only cut off after the last inversion of the track error signal from the track control circuit.

Figure 7:
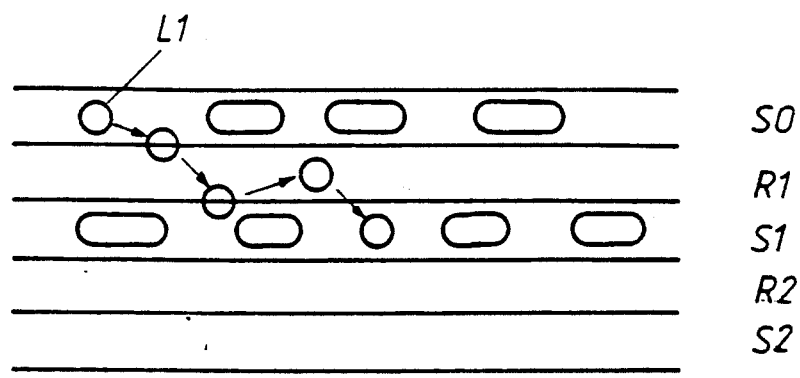
FIG. 7 the motion of the light beam at track jumping according to a second example.

In second example of the invention, the offset voltage will be cut off for jumping from one track to the next from the track control circuit before or after the first inversion, meaning before the second inversion of the track error signal. For jumping across several tracks this process will be repeated from track to track. FIG. 7 shows the motions of the light beam L1 for this second example.

The light beam L1 will be displaced, as at the first example, by the offset voltage OF so far from the middle of the track S0, that it radiates by its one half on the track S0 and by its other half on the space R1. Now the track error signal will be inverted for the first time. Because the light beam therefore moves further by one track width, it radiates now by one half on the space R1 and by one half on the track S1. Now the offset voltage is removed. The light beam moves therefore to the middle of the space R1. The second inversion of the track error signal TE causes now, that the light beam L1 moves to the middle of the track S1. If jumping across several tracks is wanted, the prededing steps of process are repeated.

A high-frequency detector D may be provided for supplying a signal to control circuit P to invert the track error signal TE when the level of the high-frequency signal attains a predetermined threshold value.

The invention is suited for e.g. CD-players, video record players, DRAW-disc-players or magneto-optical sets.

What is claimed is:

1. A method for track skipping in a track control circuit with an optical scanner, comprising the steps of: directing a first light beam and a second light beam to an information medium and said first light beam and said second light beam from said information medium; impinging each reflected light beam onto a separate photodetector having an output; subtracting the outputs of said photodetectors to generate a sine-shaped track error signal representing a difference between at track being scanned and a desired track to be scanned on said information medium; generating an offset quantity for skipping across a number of tracks and having dimensions so that a light beam incident on said information medium for tracking data thereon will be displaced by a predetermined amount off track center and thereby radiate partially on the track being scanned and partially on the space between the track being scanned and an adjacent track; supplying said track control circuit at beginning of track skipping with said offset quantity; inverting the track error signal a number of times equal to twice the number of tracks skipped; separating the offset quantity from the track control circuit earliest after first inversion and latest after last inversion of the track error signal, said track control circuit remaining closed during track skipping.

2. The method as defined in claim 1, including the step of separating again said offset quantity from said track control circuit after the first inversion of the track error signal.

3. The method as defined in claim 1, wherein said offset quantity is separated from said track control circuit before the first inversion of the track error signal.

4. The method as defined in claim 1, wherein said offset quantity is separated from said track control circuit immediately after the first inversion of said track error signal.

5. The method as defined in claim 3, wherein said method is repeated for skipping across a plurality of tracks.

6. The method as defined in claim 4, wherein said method is repeated for skipping across a plurality of tracks.

7. The method as defined in claim 1, wherein said offset quantity has a polarity dependent on directions of skipping radially toward and outward.

8. The method as defined in claim 1, wherein said track error signal has an instant of inversion dependent on level of a high-frequency signal produced by said first light beam when scanning data on said information medium.

9. A track regulating arrangement for track skipping in a track control circuit with an optical scanner and a first light beam and a second light beam directed to an information medium and reflected from the information medium comprising: a first photodetector receiving said first light beam and having an output; a second photodetector receiving said second light beam and having an output; means for subtracting the outputs of said first and second photodetectors to generate a sine-shaped track error signal representing a difference between a track being scanned and a desired track to be scanned on the information medium; means for generating an offset quantity for skipping across a number of tracks and having dimensions so that a light beam incident on said information medium for tracking data thereon will be displaced by a predetermined amount off track center and thereby radiate partially on the track being scanned and partially on the space between the track being scanned and an adjacent track; means for supplying said track control circuit at beginning of track skipping with said offset quantity; means inverting the track error signal a number of times equal to twice the number of tracks skipped; means for separating the offset quantity from the track control circuit earliest after first inversion and latest after last inversion of the track error signal; a control amplifier having a first input for receiving the track error signal; generator means for producing a positive or negative offset voltage corresponding to said offset quantity and having an output connected to a second input of said control amplifier; a controllable switch with input connected to an output of said control amplifier; a regulating element in the track control circuit connected directly to a first output of said switch for regulating positioning of the light beam; converter means connected between a second output of said switch and said regulating element; said control circuit having a first output connected to said generator means; said control circuit having a second output connected to a control input of said switch; said track control circuit remaining closed during track skipping.

10. A track regulating arrangement as defined in claim 9, including counter means in said control circuit for counting the number of inversions of the track error signal.

11. A track regulating arrangement as defined in claim 9, including a high-frequency detector for supplying a signal to said control circuit for inverting the track error signal when a high frequency signal attains a level corresponding to a predetermined threshold value.

12. A track regulating arrangement as defined in claim 9, including a counter in said control circuit for counting a number of inversions of said track error signal; a high-frequency detector supplying a signal to said control circuit for inverting said track error signal when a high-frequency signal has attained a level corresponding to a predetermined threshold value.

13. A method for track skipping in a track control circuit with an optical scanner, comprising the steps of: directing a first light beam and a second light beam to an information medium and said first light beam and said second light beam from said information medium; impinging each reflected light beam onto a separate photodetector having an output; subtracting the outputs of said photodetectors to generate a sine-shaped track error signal representing a difference between a track being scanned and a desired track to be scanned on said information medium; generating an offset quantity for skipping across a number of tracks and having dimensions so that a light beam incident on said information medium for tracking data thereon will be displaced by a predetermined amount off track center and thereby radiate partially on the track being scanned and partially on the space between the track being scanned and an adjacent track; supplying said track control circuit at beginning of track skipping with said offset quantity; inverting the track error signal a number of times equal to twice the number of tracks skipped; separating the offset quantity from the track control circuit earliest after first inversion and latest after last inversion of the track error signal, said track control circuit remaining closed during track skipping; separating again said offset quantity from said track control circuit after the first inversion of said track error signal, said offset quantity having a plurality dependent on directions of skipping radially inward and outward, said track error signal having an instant of inversion dependent on a level of a high-frequency signal generated by said first light beam when scanning data on said information medium.

* * * * *